(No Model.)

J. B. KIBLER.
POT LIFTER.

No. 334,666. Patented Jan. 19, 1886.

Witnesses:
Ina Darling.
Orlando H. Peck

Inventor:
John B. Kibler
By P. H. Gunckel
Attorney

UNITED STATES PATENT OFFICE.

JOHN B. KIBLER, OF MINNEAPOLIS, MINNESOTA, ASSIGNOR OF ONE-HALF TO LUCIUS R. TOWNSEND, OF SAME PLACE.

POT-LIFTER.

SPECIFICATION forming part of Letters Patent No. 334,666, dated January 19, 1886.

Application filed July 24, 1885. Serial No. 172,517. (No model.)

*To all whom it may concern:*

Be it known that I, JOHN B. KIBLER, a citizen of the United States, residing at Minneapolis, in the county of Hennepin and State of Minnesota, have invented certain new and useful Improvements in Pot-Lifters, of which the following is a specification.

My invention relates to devices for lifting and tipping kettles and other utensils; and the object of the invention is to provide a convenient device whereby a kettle or like utensil can be tipped and its contents poured out without taking hold of the vessel with the hands.

Figure 1:
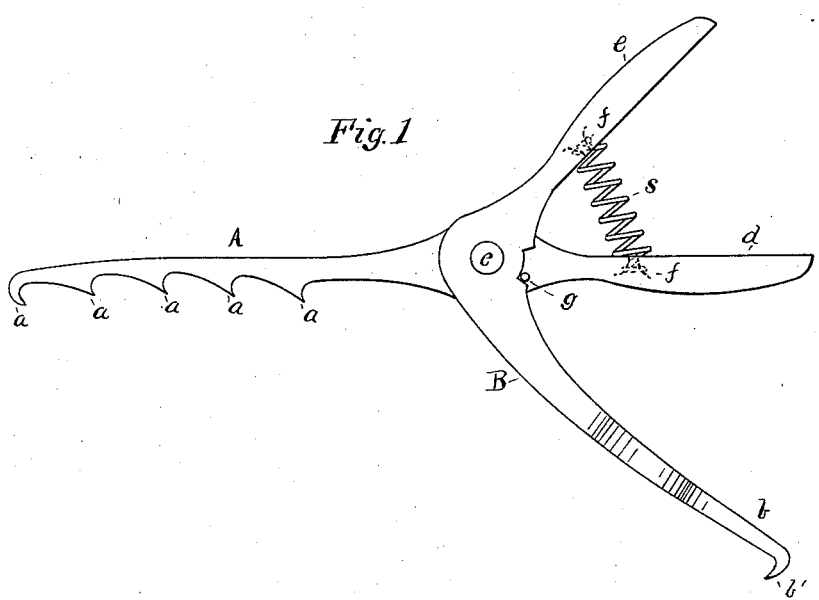
Figure 2:
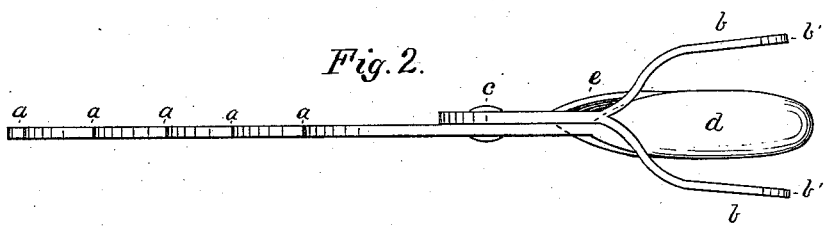

In the drawings, Figure 1 is a side elevation of the device, and Fig. 2 a bottom view of the same.

A is a bar, which may be straight or slightly bent, and provided at its under side along its outer portion with a series of backwardly-curved teeth or hooks, a, and B is an angular bar pivoted at its angle to the bar A, and having bifurcations b toward its extremity, and provided with hooks b' on the ends of the bifurcations. The two pieces thus form jaws for grasping the opposite sides of the rim of a utensil.

c is a screw or bolt by which the two pieces A and B are pivoted together.

d and e are handles on the pieces A and B, respectively, and by preference these handles are made somewhat oval and concavo-convex for convenience in using them and for giving them lightness.

s is a spiral spring set between the handles d and e, with its ends placed over lugs f (shown by dotted lines in Fig. 1) projecting from the under sides of the handles. The spring spreads the handles, thus holding the jaws open ready for use. A pin, g, on the piece A, engages a shoulder on the piece B, to limit the spread of the handles.

In using the device the hooks b' are clasped on the rim or edge of the vessel at one side, and one of the series of teeth a is clasped over the rim at the opposite side of the vessel. Then by compression of the handles the vessel is firmly held so that its contents may be poured out without having the hand in the way of escaping steam. If the utensil has a lid, the lid will be kept in place by the bifurcations b while the liquid is being poured off, thus avoiding the necessity of holding the lid on with the hand.

Having fully described my invention, what I claim, and desire to secure by Letters Patent, is—

1. A kettle-lifter comprising a straight or slightly-curved bar provided with teeth and a handle, an angular bar pivoted thereto and having forks provided with hooks at their ends on one of its arms and a handle on the other arm, and a spring between said handles for holding them apart, substantially as set forth.

2. In a kettle-lifter, the toothed bar A, having handle d, the bar B, having forks b, provided with hooks b', and the handle e, the pivot c, and spring s, constructed and arranged substantially as and for the purpose set forth.

JOHN B. KIBLER.

Witnesses:
INA DARLING,
PATRICK H. GUNCKEL.